(12) United States Patent
Ehrmann et al.

(10) Patent No.: US 8,046,977 B2
(45) Date of Patent: Nov. 1, 2011

(54) PACKAGING MACHINE

(75) Inventors: Elmar Eugen Ehrmann, Bad Groenenbach (DE); Tieme Jan Slomp, Bad Groenenbach (DE); Hans-Joachim Boekstegers, Starnberg (DE)

(73) Assignee: Multivac Sepp Haggenmüller GmbH & Co. KG (DE)

( * ) Notice: Subject to any disclaimer, the term of this patent is extended or adjusted under 35 U.S.C. 154(b) by 586 days.

(21) Appl. No.: 11/918,888

(22) PCT Filed: Apr. 19, 2006

(86) PCT No.: PCT/DE2006/000678
§ 371 (c)(1),
(2), (4) Date: Jul. 15, 2008

(87) PCT Pub. No.: WO2006/111141
PCT Pub. Date: Oct. 26, 2006

(65) Prior Publication Data
US 2009/0071099 A1    Mar. 19, 2009

(30) Foreign Application Priority Data
Apr. 19, 2005   (DE) .......................... 10 2005 018 251

(51) Int. Cl.
*B65B 57/00* (2006.01)
(52) U.S. Cl. .......................... 53/502; 53/135.1; 53/136.1
(58) Field of Classification Search ................... 53/502, 53/503, 135.1, 136.1, 136.3
See application file for complete search history.

(56) References Cited

U.S. PATENT DOCUMENTS

| | | | |
|---|---|---|---|
| 2,712,408 A | | 7/1955 | Weber |
| 3,244,278 A | * | 4/1966 | Weprin et al. ................ 209/595 |
| 3,566,613 A | * | 3/1971 | Kinney .......................... 62/130 |
| 3,662,511 A | * | 5/1972 | Eliasberg ....................... 53/411 |
| 3,977,483 A | * | 8/1976 | Greanias ........................ 177/1 |
| 4,065,911 A | * | 1/1978 | Fagan ............................ 53/53 |
| 4,230,195 A | | 10/1980 | Graffin |
| 4,390,390 A | * | 6/1983 | Margraf et al. ............... 156/566 |
| 4,415,048 A | * | 11/1983 | Teraoka .......................... 177/5 |
| 4,720,961 A | * | 1/1988 | Jordan .......................... 53/502 |
| 5,086,855 A | * | 2/1992 | Tolson ............................ 177/5 |
| 5,365,722 A | * | 11/1994 | Edwards et al. ............... 53/502 |
| 5,787,687 A | * | 8/1998 | Mueller et al. ................. 53/473 |
| 6,018,128 A | * | 1/2000 | Asai .............................. 177/4 |
| 6,455,002 B1 | * | 9/2002 | Jokes et al. .................... 422/63 |
| 7,279,644 B1 | * | 10/2007 | Kasel ........................ 177/25.13 |
| 7,694,497 B2 | * | 4/2010 | Tagliavini et al. ............. 53/499 |
| 7,732,716 B2 | * | 6/2010 | Schulzki ........................ 177/1 |
| 2004/0000436 A1 | * | 1/2004 | Eaton et al. ................ 177/25.15 |

FOREIGN PATENT DOCUMENTS

| | | |
|---|---|---|
| DE | 44 09 908 A1 | 10/1994 |
| DE | 197 35 942 A1 | 3/1999 |
| DE | 692 31 097 T2 | 11/2000 |
| DE | 102 32 136 A1 | 1/2004 |
| EP | 0 865 989 A2 | 3/1998 |
| GB | 935 142 | 2/1961 |

* cited by examiner

Primary Examiner — Hemant M Desai
(74) Attorney, Agent, or Firm — Brooks Kushman P.C.

(57) ABSTRACT

A packaging machine and a method for the production of packages by the packing of material in packages, with a machine having at least one processing station, such as a sealing station, a cutting station or similar station and a weighing station (8) for determination of the weight of the filled and sealed packages (7), is provided which has less space requirements than conventional packaging machines and improved manipulation. According to the invention, the above is achieved, whereby the weighing station (8) and/or the at least one processing station has a controller, in which the working speed of the weighing station (8) is synchronized with the working speed of the previous processing station.

17 Claims, 2 Drawing Sheets

PACKAGING MACHINE

This application is a national stage filing under 35 U.S.C. 371 of PCT/DE2006/000678, filed Apr. 19, 2006, which claims priority to German Application No. 10 2005 018 251.8, filed Apr. 19, 2005, the disclosure of which is incorporated by reference in its/their entirety herein.

CROSS REFERENCE TO RELATED APPLICATIONS

This application contains some subject matter related to U.S. application Ser. No. 11/918,715 filed Oct. 18, 2007 and U.S. application Ser. No. 11/918,896 filed Oct. 19, 2007.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION (1) Field of the Invention

The invention relates to a packaging machine and a method for producing packages by packaging articles to be packed in packagings in which the machine has at least one processing station such as a sealing station, a cutting station or the like and having a weighing station for weight determination of the filled and sealed packages as well as a method for determining the weight of filled and sealed packages by synchronizing the working speed of an upstream processing station, a sealing station or the like.

(2) Description of Related Art Including Information Disclosed Under 37 CFR 1.97 and 1.98

Commercially available packaging machines of this type are provided with different processing stations, for example sealing stations, for sealing packagings which are filled with articles to be packed.

Here, a distinction is made between a plurality of types of packaging machines, for example those which seal individual packagings which are separated from one another and are filled with articles to be packed (what are known as tray sealers) and packaging machines, such as thermoforming machines, in which a plurality of packages are produced, filled and sealed together. In the latter machine type, the said plurality of contiguous packages are subsequently fed to a cutting unit which cuts the individual packages from the overall assembly. In packaging machines of the abovementioned type, the sealed packages are discharged via a discharge unit.

Depending on the type of article to be packed, weight determination and labeling are subsequently required. For this purpose, corresponding weighing and labeling machines have previously been provided which are arranged behind the discharge unit. These weighing and labeling machines operate independently of the packaging machine, with the result that a separating unit has to be arranged between the two machines for supplying the weighing and labeling apparatuses with individual packages. In order to perform the weighing and labeling independently of the discharge from the packaging machine, a buffer unit is also frequently provided for receiving packages before their separation for the weighing and labeling machines.

As a result of this procedure, a long transport path is required for the overall construction, which is associated with a corresponding space requirement. Moreover, the operating personnel have to set and monitor the two machines separately from one another on different input units.

Furthermore, hand-actuated machines have gained awareness in the commercial field, in which shells which are filled with articles to be packed are inserted into a drawer-like shell receptacle and are weighed by a weighing unit which is integrated into the draw. The filled shells are inserted manually, the weighing station being reset manually to the zero value after the insertion of each individual shell. The drawer-like receptacle is subsequently pushed into the machine and the shells are sealed. After the slide-in unit has been opened again, individual labels having weight specifications are printed out by the machines, which labels are applied manually to the associated sealed packages. In a manual machine of this type, the abovementioned disadvantageous, long transport path is dispensed with. However, the said manual machine does not make automatic packaging of the articles to be packed possible and is susceptible, in particular, to errors of the operating person, as firstly open packages are weighed and the labels have to be assigned manually after sealing. Moreover, satisfactory weighing with a movable weighing unit can be ensured only with difficulty.

BRIEF SUMMARY OF THE INVENTION

It is therefore an object of the invention to provide a packaging machine which manages with a relatively small space requirement and makes improved handling possible.

Proceeding from the prior art of the type which is mentioned in the Background Of The Invention, this object is achieved by having at least one control unit in the weighing station and/or at least one processing station which synchronizes the working speed of the weighing station and/or at least one processing station with the working speed of a processing machine arranged upstream or in front of it. Similarly the method of the invention involves the step of synchronizing the working speed of a second processing station in sequence by a first processing station immediately after processing by a first processing station in sequence particularly where the first processing station in sequence performs a determination of the weight of filled and sealed packages.

Advantageous refinements and developments of the invention are possible as a result of providing a control unit for the weighing station and at least one processing station of the packaging machine, having a common control unit for all processing stations including the weighing station, having the weighing station arranged in a stationary manner, having a feeding unit for feeding packages into a weighing station, having a feeding unit for feeding packages to be weighed to a weighing station between the weighing station which is arranged upstream or in front of it and the weighing station, having the speed of the feeding unit synchronized with the working speed of the sealing station and/or the weighing station, providing a multiplicity of packages in a synchronized cycle by means of the processing station, having a feeding unit feed two or more packages to the weighing station in a synchronized cycle with the sealing station controlled by the feeding unit, having the weighing station configured for detecting the weight during the movement of one or more packages, having the weighing station with a weighing belt with a controller for synchronizing the belt speed with the working speed of a processing unit arranged upstream or in front of it and/or of the feeding unit, having the weighing station configured for receiving two or more packages, having a detection device for detecting the weight of two or more packages and of the weight which is changed by a subsequent feeding or discharging of an individual package or a number of packages which are weighed together which has the ability to determine the weight of an individual package or number of packages from the difference between the weights, having a single discharge means for discharging the packages from the weighing station, having a labeling station arranged after the weighing station, having the labeling station configured for printing out product specific weight data and/or for printing out weight-dependent data, having a sorting ejector arranged after the weighing station and having an additional control unit for controlling the packages.

Accordingly, a packaging machine according to the invention is distinguished by the fact that the weighing station and/or the at least one processing station comprise/comprises at least one control unit, by means of which the working speed of the weighing station can be synchronized with the working speed of the processing station which is arranged in front of it.

In this way, a separate separating and/or buffer unit between the processing station of the packaging machine which is arranged in front of it and the weighing station can be omitted, as the processing station and the weighing station can operate in a synchronized manner with one another. The setting and adaptation of the weighing station to the packaging machine or the processing station or processing stations is also improved in a packaging machine according to the invention, as the control unit takes over the synchronization. In this way, a considerably more compact construction and improved handling are possible.

A synchronization capability according to the invention can be brought about here, for example, by two or more control units which are coordinated with one another. This coordination can be performed in different ways, for example by transmission of data and/or control signals. Here, the transmission can be provided in a unidirectional or bidirectional manner. In one particular embodiment, a bus system, by means of which various control units can communicate with one another, is provided for the transmission of data and control signals. Here, the transmission path can be realized via cable connections or else also in a wireless manner.

The weighing station can be integrated into a processing station, for example into the sealing station, or can also be arranged after the latter. It is essential here that the weighing operation itself is performed only on the sealed package, in order to avoid faulty weight specifications, for example as a result of a subsequent removal of articles to be packed.

In one development of the invention, a common control unit is provided for the weighing station and the packaging machine or its processing stations. The weighing station is integrated into the packaging machine in this way. However, this does not necessarily mean the physical connection of the weighing station to the packaging machine, for example to its machine frame. If it is required for reasons of functional security that the weighing station is set up and fastened separately, this is also readily possible in a weighing station which is integrated in this way. The functional integration of the weighing station in the packaging machine is essential for the invention.

The weighing station is advantageously arranged in a stationary manner, that is to say it is at a standstill at least during operation, but preferably permanently at its predefined operating location. As a result, errors which can be caused by any movement of the weighing station and/or by a faulty orientation of the weighing station are avoided after the weighing apparatus has been set up correctly once.

The packages which are to be weighed are preferably not fed manually to the weighing station, but automatically by a feeding unit. This feeding unit is preferably likewise configured such that it can be synchronized with the working speed of the processing station and/or the weighing station, in order not to disrupt the synchronization between the processing station and the weighing station.

In one development of this embodiment, the packaging machine overall is configured as an automatic machine, in which the packagings are transported automatically, at least starting from the filling operation, from and to the individual processing and control stations of the packaging machine.

In one particular embodiment of the invention, the feeding unit for feeding the packages to the weighing station is arranged between the workstation and the weighing station, the weighing station being provided as a separate unit from the processing station. This has the advantage that the location and the fastening of the weighing station can be selected independently of the processing station. Any disruptions during the weighing operation which are caused by the operation of the processing station can therefore be avoided.

The processing station is advantageously synchronized, the feeding unit for feeding the sealed packages to the weighing station working at the synchronized cycle of this processing station.

Synchronized operation of this type corresponds, for example, to the method of operation of the sealing station in known packaging machines, in which individual shells which are filled with articles to be packed are sealed (tray sealers). Here, it is certainly possible for a plurality of packages which are present in individual form to be sealed in one working cycle. As a result of the synchronized operation, the provided number of sealed packages is released from the sealing station with every synchronized cycle and is fed to the weighing station via the feeding unit. Here, this synchronization of the feeding unit with the synchronized cycle of the processing station ensures a reliable flow of goods from the processing station, the weighing station being adapted to this working speed according to the invention.

In another embodiment, as described above, the individual packages are cut out of an overall arrangement of packages by means of a cutting station, synchronized operation also being possible here, with the result that a plurality of packages to be weighed are provided in a synchronized manner and are to be fed to the weighing station.

Corresponding synchronized operation is also provided for the weighing station if a discharge unit which is synchronized correspondingly is provided for the weighing station. Here, the working cycle of the weighing station does not necessarily have to run at the same synchronized cycle as the processing station which is arranged in front of it. Depending on the number of packages which are provided in one synchronized cycle by the processing station, an integral multiple of this synchronized cycle is also provided as a working cycle for the weighing station, in order to weigh every goods package of the multiplicity of packages which are fed.

In one preferred embodiment, however, the weighing station is not operated cyclically, but continuously, that is to say the weighing station is configured for detecting the weight during the movement of one or more packages. A dynamic weighing operation of this type, in which the packages are moved continuously through or over the weighing station, can be integrated more readily into a packaging machine of this type and makes a higher processing speed of the weighing station possible. Moreover, errors as a result of the packages to be weighed being stopped and started are avoided. In particular, the position of the packages on or in the weighing station is not influenced by stopping and/or acceleration processes and any errors which are caused as a result are suppressed.

In one development of the invention, a discharge unit for transporting the weighed packages away from the weighing station is provided, which discharge unit works cyclically or, in the case of the dynamic weighing which is described above, continuously.

The discharge unit of the weighing station can be configured, for example, as a transport belt. Here, as in known weighing and labeling apparatuses, the weighing station can comprise a weighing belt. Here, the weighing of the packages to be weighed takes place directly on the transport belt which is driven here either continuously, in the case of the dynamic weighing which is described above, or cyclically.

Here, the weighing belt is preferably provided with a control unit, in order to synchronize the belt speed in a manner according to the invention with the working speed of the processing station which is arranged in front of it, for example a sealing station and/or cutting unit and/or a feeding unit which is connected in between.

Here, continuous operation of the weighing belt is also conceivable in the case of cyclical feeding of the packages to be weighed. It must merely be ensured that sufficient time is always available for the individual weights measurements.

Here, for example, individual weighing is conceivable, the feeding unit being configured in such a way that individual packages to be weighed or individual groups of packages to be weighed together are deposited on the weighing station or the weighing belt for the corresponding weighing operation. This is conceivable, for example, with a gripper or lifter system which removes a plurality of packages from the processing station which is arranged in front of it, for example a sealing or cutting station, and deposits them on the weighing station. Here, the overall quantities of the packages which can be fed by the feeding unit or else, in the case of individual weighing which is described above, successive individual packages can be deposited on the weighing station.

The weighing station is preferably configured for receiving two or more sealed packages.

Here, there can be provision for detection of the weight of two or more packages and detection of the weight which is changed by subsequent feeding or discharging of an individual package or a number of packages which are to be weighed together. Here, the weight of an individual package or a number of packages which are to be weighed together is determined from the difference between the weights which are determined in this way.

As a result of this configuration of the weighing apparatus, a relatively large weighing unit can also be used in the case of a relatively small package format by virtue of the fact that a plurality of packages are weighed at the same time with their total weight.

In this embodiment, for example, the total number of packages which are finished in one working cycle by the processing station which is arranged in front can be fed jointly to the weighing station. The determination of the weights of individual packages or different groups of packages which are to be weighed together can then be performed by a separate discharge from the weighing station. Here, the individual weights which are to be determined can be determined via a subtraction process from the overall weight of two or more packages, first of all the overall weight being determined and then the weight which is reduced by the discharge of the sealed packages being determined and being subtracted from the overall weight which was previously determined.

In this embodiment, once again a continuous or cyclical circulation of a weighing belt is also provided.

In the case of multiple-column packaging machines, the weighing station can have a plurality of circulating weighing belts or bands which are arranged next to one another, with the result that the packages can be discharged separately from one another from one row of packages which are arranged next to one another as a result of the separate drive of individual belts or bands. Here, the weight can once again be determined by the subtraction process which is described above.

In order to reliably ensure the separate discharge of packages from a weighing belt, it is recommended to deposit them at a minimum spacing from one another on the weighing belt. This is preferably performed by the feeding unit which feeds the packages from the processing station which is arranged in front to the weighing station. In one particular design variant of a feeding unit of this type, pushing elements are provided, for example, which push the packages to be weighed onto the weighing station. As long as the spacing of the pushing elements is of correspondingly large dimensions, a predefined spacing between the packages to be weighed can be provided at the same time as a result.

The packaging machine is preferably provided with a labeling station which is arranged after the weighing station. In this way, the packaging machine according to the invention can assume the complete function of the previously customary arrangement with a packaging machine and a weighing and labeling machine which is separate from it. Accordingly, the packed goods can be removed from a packaging machine of this type having an integrated weighing station in a manner which has been labeled with weight specifications.

In one advantageous development of this embodiment, the labeling station is used at the same time for printing out product-specific and/or weight-independent data. Labeling machines of this type are already frequently provided in packaging machines, in order to attach, for example, specifications about the type of product, best before dates or the like. In the case of a weighing and labeling machine which is arranged behind the packaging machine, there have accordingly previously always been two labeling stations. According to the invention, one labeling station of this type can therefore be omitted.

The packaging machine according to the invention is not only suitable for determining different package weights and labeling the packages accordingly; but also provides a packaging machine according to the invention can also expediently be used in what are known as goods with identical weights, in order to check whether all packages which leave the packaging machine are actually filled with the same weight. For this application of a packaging machine of this type, a sorting ejector can also optionally be arranged after the said packaging machine, in order to reject the packages which are not of the same weight. If desired, these packages which are not of the same weight can be marked here at the same time with their actual weight, with the result that they can be sold separately from the goods which have the same weight.

In one particular embodiment of the invention, in addition, one or more further control units C (FIG. 1) are provided for controlling the packages which are produced with the packaging machine according to the invention. Control unit C includes a weight detection device W for detecting the weight of packages. Control units of this type serve to provide additional quality control. Control units of this type when present, such as C1 (FIG. 1) for example, optionally are in the form of a metal detector which serves to check for metallic foreign bodies. Controllers C and C1 have inward and outward facing arrows symbolizing an input and output vector. Visual control can also be expedient depending on the application, in order to check the packages for complete inscription or in principle for the desired appearance. A leakage station can also be provided as additional control unit, in order to detect leaks, for example in vacuum packagings or in inert gas packagings.

Here, these additional control units can be arranged at a different position, for example in front of the weighing station, between the weighing station and the labeling station or else behind the labeling station. The integration of additional control units of this type into the packaging machine once again serves to realize a compact construction of the overall arrangement.

BRIEF DESCRIPTION OF THE SEVERAL VIEWS OF THE DRAWINGS

Various exemplary embodiments of the invention are shown in the drawing and will be explained in greater detail in the following text using the figures, in which, in detail.

DETAILED DESCRIPTION OF THE INVENTION INCLUDING BEST MODE

Figure 1:
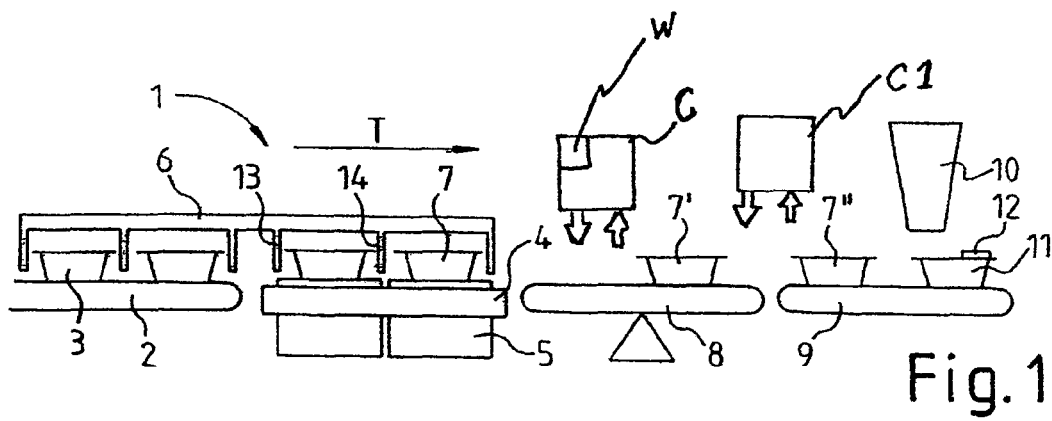
FIG. 1 shows a diagrammatic side view of a first embodiment of the invention.

The side view of FIG. 1 shows part of a packaging machine 1 according to the invention. The rear end of a filling belt 2 can be seen, in which the goods to be packed are filled into individual shells 3, for example made from plastic.

A shell receptacle 4 which can be displaced transversely in the direction Q (cf. FIG. 2) and has a lifting unit 5, in order to lower the shells 3 into the shell receptacle 4 or to raise them from the shell receptacle 4, is situated after the filling belt 2 as viewed in the transport direction T.

A pushing unit 6 is situated above the rear end of the filling belt 2 and the shell receptacle 4. The pushing unit 6 is capable of displacing a plurality of shells 7 simultaneously, in the present case two shells 7, from the shell receptacle 4 onto a weighing belt 8 or a weighing station having a controller C and a weight detecting device W which is arranged after it, and for displacing two shells 3 from the filling belt 2 onto the shell receptacle 4.

An arrangement of this type is known, for example, in many machines of the type (what are known as tray sealers), in which individual separate shells are filled and sealed. Here, the shell receptacle 4 with the shells 7 which are situated in it is displaced in the transverse direction Q into a sealing station (not shown in greater detail) and subsequently, after the sealing, is moved again into the shown position for transporting away of the sealed shells 7. Here, two shell receptacles 4 which are moved in opposite directions can also be provided, in order to seal the shells of one shell receptacle, while the other shell receptacle is emptied and unloaded again.

Accordingly, in the present exemplary embodiment, the pushing unit 6 displaces two sealed shells 7 together onto the weighing belt 8.

A marking belt 9, above which a labeling unit 10 is arranged, is arranged after the weighing belt 8. The labeling unit 10 is capable of printing out labels and attaching them on the packages 11 which are to be labeled.

A label 12 of this type is shown by way of example in the figures.

Figure 2:
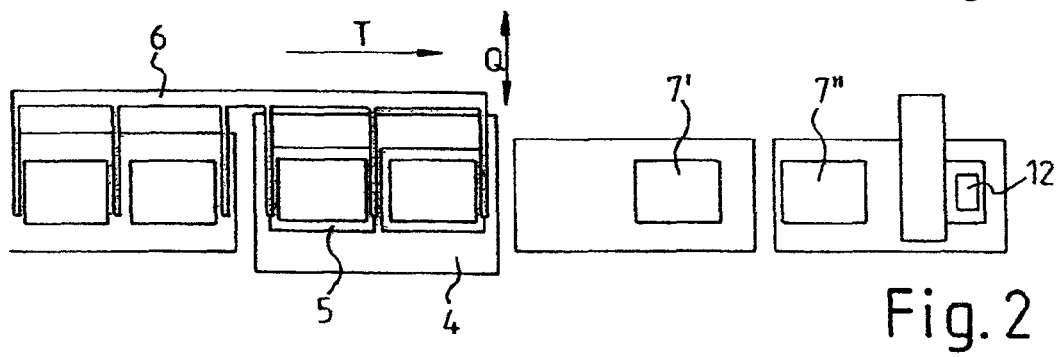
FIG. 2 shows a plan view of an embodiment according to FIG. 1.

In the illustration according to FIGS. 1 and 2, only one goods package 7' is still situated on the weighing belt 8. This is brought about by the fact that the shells 7', 7" are conveyed further successively from the weighing belt 8 onto the marking belt 9.

Accordingly, before the state which is shown, the two shells 7', 7" were situated together on the weighing belt 8, onto which they were pushed by the pushing unit 6. The shell 7" has already been conveyed onto the marking belt as a result of the conveying movement of the weighing belt 8 and the marking belt 9.

First of all, however, the total weight of the two shells 7' and 7" was determined. In the state which is shown, after the further transport of the shells 7" onto the marking belt 9, the individual weight of the shell 7' can then be determined. By subtracting this individual weight from the overall weight, the weight of the shell 7" is therefore known at the same time, with the result that the said shell 7" can be provided with the corresponding weight specification by the labeling unit 10.

The pushing unit 6 comprises various pushing elements 13, 14 which are at a greater spacing than the external dimension of the packages 7 in the transport direction T. When the pushing unit 6 is used, the packages 7 come into contact with the respective pushing elements 13, 14, so that a defined spacing results because of this between the shells 7' 7" during transport onto the weighing belt 8. This spacing ensures that the shells 7', 7" can be discharged individually from the weighing belt 8 without mutual disruption, and the above-described weighing operations are therefore made possible.

Figure 3:
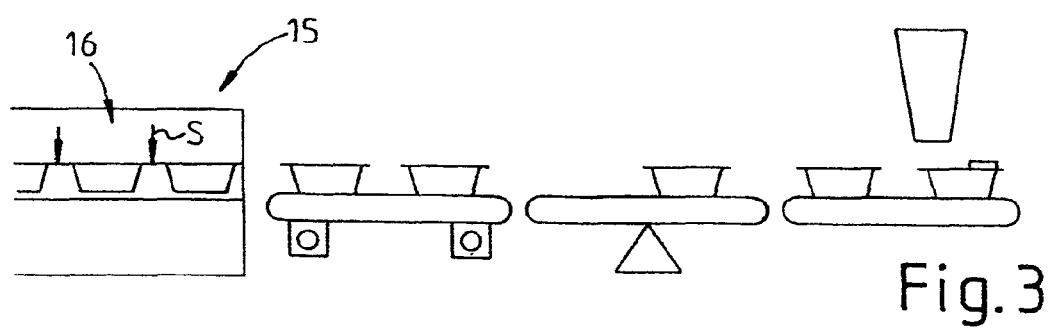
FIG. 3 shows a side view of a second embodiment of the invention.

The embodiment according to FIG. 3 corresponds to an arrangement with what is known as a roll-fed machine or thermoforming machine for producing the packages to be weighed. This packaging machine 15 produces a multiplicity of contiguous packages which are separated from one another in a cutting station 16 by a cutting process. The cutting process is indicated by the arrows S in FIG. 3.

Accordingly, in a packaging machine 15 of this type, a multiplicity of packages 17 are always provided in one working cycle. In the present exemplary embodiment, in each case six packages 17 in two rows and three columns are provided, in relation to the transport direction. This matrix-like arrangement of the packages 17 is first of all moved onto a sliding belt 18 which can be displaced in the transverse direction Q transversely with respect to the transport direction T. The sliding belt 18 comprises individual belts or individual bands, in order to drive the packages 17, 17', 17" which belong to one column in the transport direction T independently of the packages of the other columns. In this way, the packages 17, 17', 17" can be conveyed in each case individually onto a weighing belt 19 which is arranged after, which packages 17, 17', 17" are placed by a corresponding transverse displacement in the direction Q of the sliding belt 18 in front of the weighing belt 19.

Figure 4:
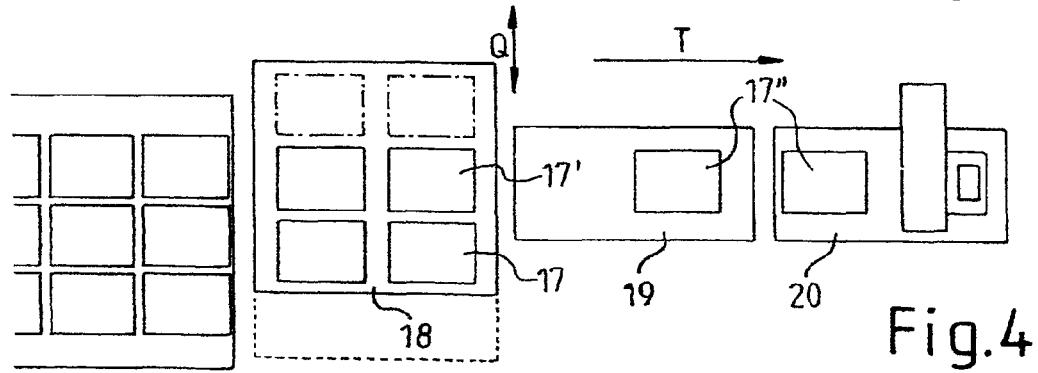
FIG. 4 shows a plan view of an embodiment according to FIG. 3.

At the instant which is shown in FIG. 4, two packages 17" from the first column have already been moved from the sliding belt 18 onto the weighing belt 19. Subsequently, one goods package 17" has already been transported further onto the marking belt 20. Moreover, the sliding belt 18 has moved further in the transverse direction Q, with the result that the packages 17' of the next column are then ready for feeding onto the weighing belt 19. By a repetition of these processes, the packages 17 of the final column can subsequently also be fed by the sliding belt 18 to the weighing belt 19.

The weighing operation itself and the labeling can subsequently be performed in the manner which is described using the exemplary embodiment according to FIGS. 1 and 2.

Figure 5:
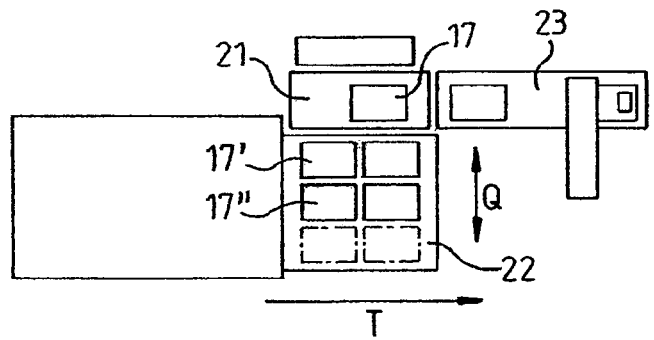
FIG. 5 shows a plan view of a third embodiment of the invention.

The design variant according to FIG. 5 corresponds substantially to the preceding exemplary embodiment, the weighing belt 21 then being arranged, however, laterally next to a discharging belt 22. Feeding onto the weighing belt 21 then takes place from the discharging belt 22 which circulates in the transport direction T and by which in each case the packages 17, 17', 17" of one column of the packages which are provided in one working cycle are fed to the weighing belt 21 in the transverse direction Q. For this purpose, a pushing device (not shown in greater detail) which can move in the transverse direction Q can be provided. The weighing operation on the weighing belt 21 and the marking belt 23 which is connected behind it is once again carried out using the subtraction method which has already been described above.

Figure 6:
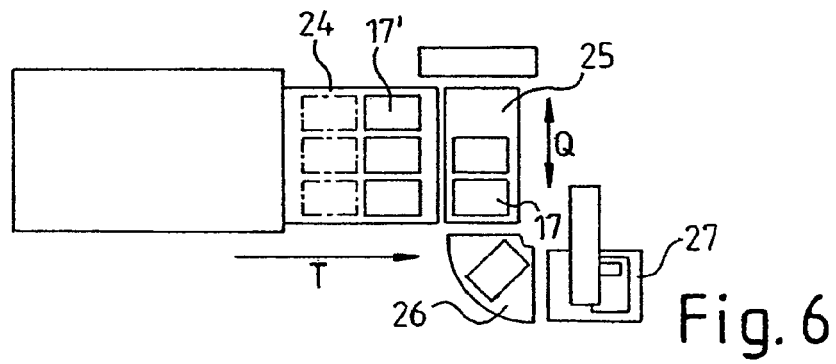
FIG. 6 shows a plan view of a fourth embodiment of the invention.

The design variant according to FIG. 6 in turn corresponds substantially to the two preceding exemplary embodiments, the discharging belt 24 then circulating in the transport direction T, however, and the weighing belt 25 being arranged behind the discharging belt 24 in a manner which circulates in the transverse direction Q.

In this design variant, in each case one row of packages 17, 17' are fed together to the weighing belt by advancing of the discharging belt 24. In the exemplary embodiment which is shown, three packages 17 are at first therefore situated temporarily on the weighing belt 25.

Discharging from the weighing belt 25 takes place in the transverse direction Q, on a cam conveying element 26 with a marking belt 27 connected after it.

The weighing operation itself once again takes place using the subtraction process. First of all, all three packages 17 which are situated on the weighing belt 25 are weighed and the overall weight is thus determined. After discharge of the first package 17 onto the cam conveying element 26, the total weight of the remaining two packages 17 is weighed, the individual weight of the goods package 17 which has already been discharged being determined by subtraction from the previously determined overall weight. The two packages 17 which are subsequently still situated on the weighing belt 25 are likewise determined in the above-described manner by determination of the overall weight and subtraction of the subsequently determined weight value.

The labeling operation is performed as described above in this embodiment.

Figure 7:
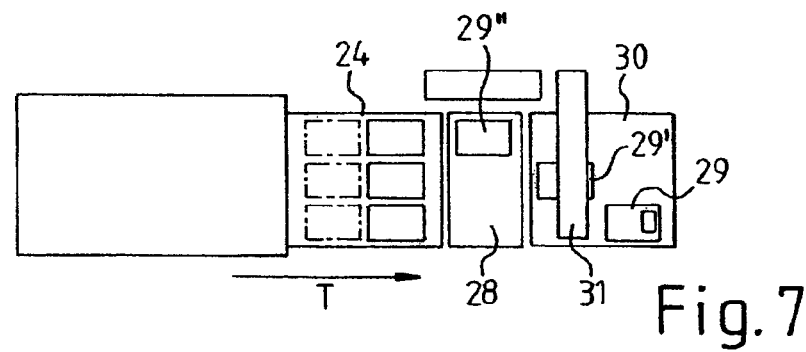
FIG. 7 shows a plan view of a fifth embodiment of the invention.

The exemplary embodiment according to FIG. 7 has a comparable arrangement with regard to the discharging belt 24 and the weighing belt 28. However, the weighing belt 28 is then designed for multiple-column drive, that is to say it comprises at least three belts or bands which circulate next to one another, with the result that the packages 29, 29', 29" can be discharged successively from the weighing belt 28 onto the marking belt. Here, the labeling unit 31 is likewise of multiple-column design, with the result that each goods package 29, 29', 29" which passes through can be provided with the corresponding weight specification.

The weighing operation itself once again takes place using the above-described subtraction process, in which in each case the individual weight of one discharged goods package is determined by subtraction of the remaining overall weight from the previously determined total weight.

Figure 8:
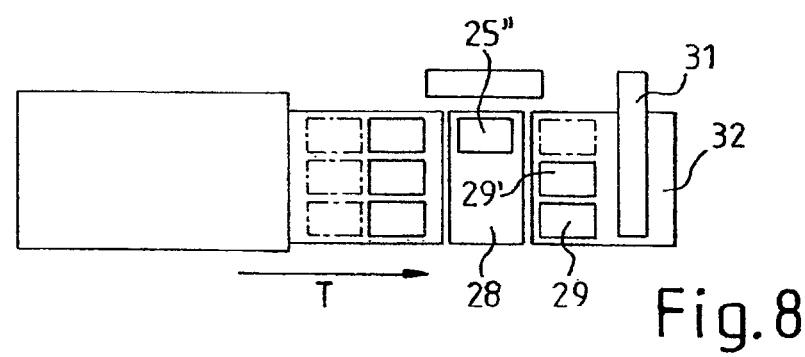
FIG. 8 shows a plan view of a sixth embodiment of the invention.

The embodiment according to FIG. 8 corresponds substantially to the embodiment according to FIG. 7, the marking belt 31 then being operated cyclically. The marking belt 31 is therefore at a standstill until all the packages 29, 29', 29" of one row are discharged onto the marking belt 31 from the weighing belt 28. Subsequently, all the packages 29, 29', 29" are labeled at the same time on the marking belt in one common passage under the multiple-column labeling unit 31.

The exemplary embodiments which are shown show various possibilities of how a weighing station can be integrated functionally according to the invention into a packaging machine.

A common feature of all the exemplary embodiments is the synchronization of the working speed of the weighing belt with the working speed of an upstream processing station by way of a corresponding control unit.

LIST OF DESIGNATIONS

1 Packaging machine
2 Filling belt
3 Shell
4 Shell receptacle
5 Lifting unit
6 Pushing unit
7 Shell
8 Weighing belt or weighing station
9 Marking belt
10 Labeling unit
11 Labeled goods package
12 Label
13 Pushing element
14 Pushing element
15 Packaging machine
16 Cutting station
17 Package
18 Sliding belt
19 Weighing belt or weighing station
20 Marking belt
21 Weighing belt or weighing station
22 Discharging belt
23 Marking belt
24 Discharging belt
25 Weighing belt or weighing station
26 Cam conveying element
27 Marking belt
28 Weighing belt or weighing station
29 Goods package
30 Marking belt
31 Labeling unit
32 Marking belt

What is claimed is:

1. A packaging machine for producing sealed packages provided with articles, the packaging machine comprising:
   a processing station;
   a weighing station disposed downstream of the processing station for weight determination of the sealed packages; and
   a control unit for synchronizing working speed of the weighing station with working speed of the processing station disposed upstream of the weighing station, wherein the control unit is a common control unit for the weighing station and the processing station;

wherein the weighing station comprises a detection device that detects a first weight of two or more packages as well as a second weight corresponding to the first weight as changed by a subsequent feeding or discharging of an individual package or a number of packages, and wherein weight of an individual package or a number of packages is determined based on a difference between the first and second weights.

2. The packaging machine according to claim 1 further comprising an additional processing station disposed upstream of the weighing station, wherein the common control unit controls the processing stations and the weighing station.

3. The packaging machine according to claim 1 wherein the weighing station is disposed in the packaging machine as an integral part of the packaging machine.

4. The packaging machine according to claim 1 further comprising a feeding unit for feeding the packages to the weighing station.

5. The packaging machine according to claim 4 wherein the feeding unit is disposed between the processing station and the weighing station.

6. The packaging machine according to claim 5 wherein the processing station comprises a sealing station, and wherein a working speed of the feeding unit is synchronized with the working speed of the sealing station and/or the weighing station.

7. The packaging machine according to claim 4 wherein the processing station provides for a plurality of packages in a synchronized cycle.

8. The packaging machine according to claim 4 wherein the processing station comprises a sealing station, and the feeding unit provides for the feeding of two or more packages to the weighing station in a synchronized cycle with the sealing station.

9. The packaging machine according to claim 1 wherein the weighing station is configured for detecting weight during the movement of one or more packages.

10. The packaging machine according to claim 1 further comprising a feeding unit disposed upstream of the weighing station, and wherein the weighing station has a weighing belt with a controller for synchronizing belt speed with the working speed of the processing station and/or working speed of the feeding unit.

11. The packaging machine according to claim 1 or 10 wherein the weighing station is configured for receiving two or more packages.

12. The packaging machine according to claim 1 wherein a separate discharge of the packages from the weighing station is provided.

13. The packaging machine according to claim 1 further comprising a labeling station disposed downstream from the weighing station.

14. The packaging machine according to claim 13 wherein the labeling station is configured for printing out product-specific weight-independent data and/or for printing out weight-dependent data.

15. The packaging machine according to claim 1 further comprising a sorting ejector disposed downstream from the weighing station, the sorting ejector being configured to eject packages that each do not have a desired weight.

16. The packaging machine according to claim 1 further comprising an additional control unit for controlling the packages.

17. The packaging machine of claim 1 further comprising an additional processing station disposed upstream of the weighing station, wherein the processing station comprises a filling station at which articles are inserted into unsealed packages, and the additional processing station comprises a sealing station at which the unsealed packages are sealed to form the sealed packages, and wherein the common control unit further controls operation of the sealing station.

\* \* \* \* \*